April 14, 1953     B. WILSON ET AL     2,634,589
APPARATUS FOR PRECOOLING TRANSPORTATION VEHICLES
Filed Sept. 12, 1949     4 Sheets-Sheet 1
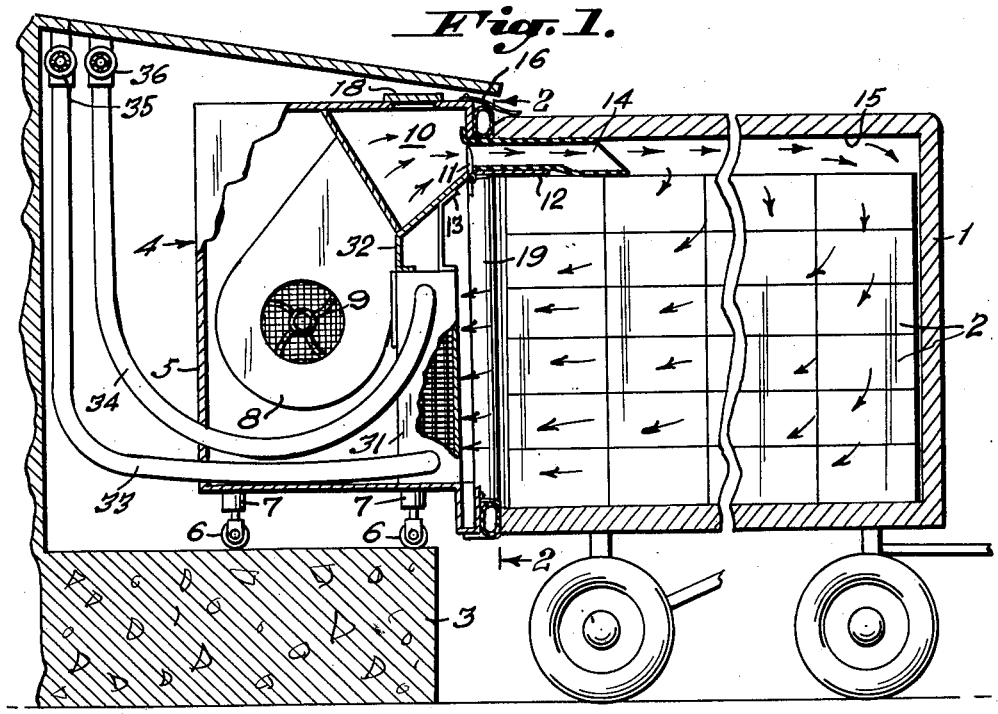
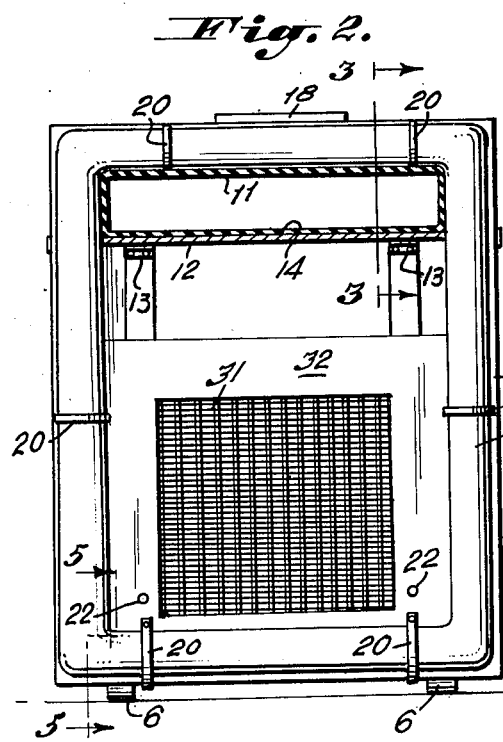
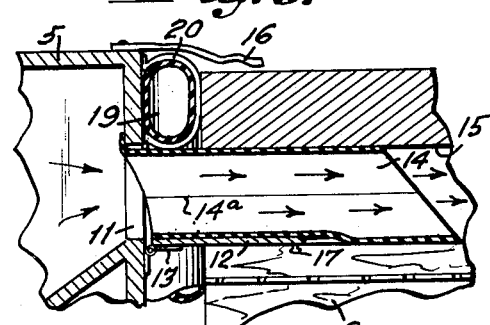
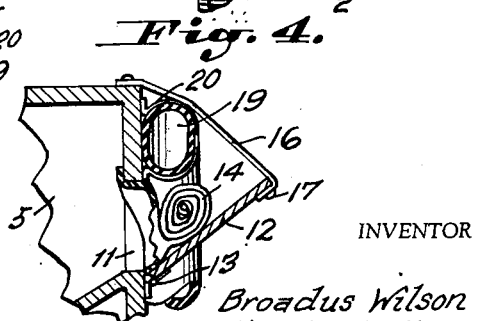
INVENTOR
Broadus Wilson
Hipolit M. Hincz
BY Elizabeth Newton Dew
ATTORNEY

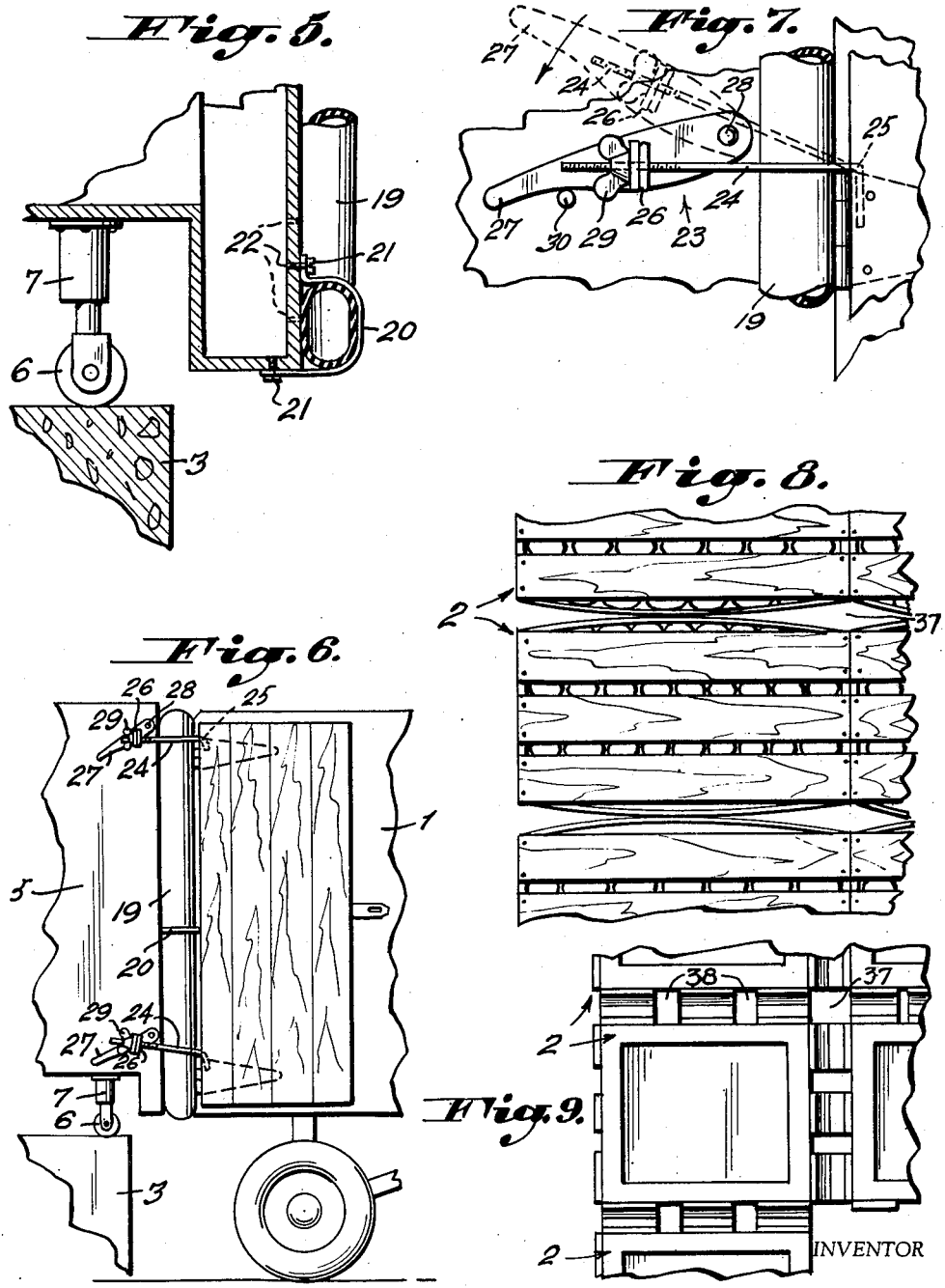

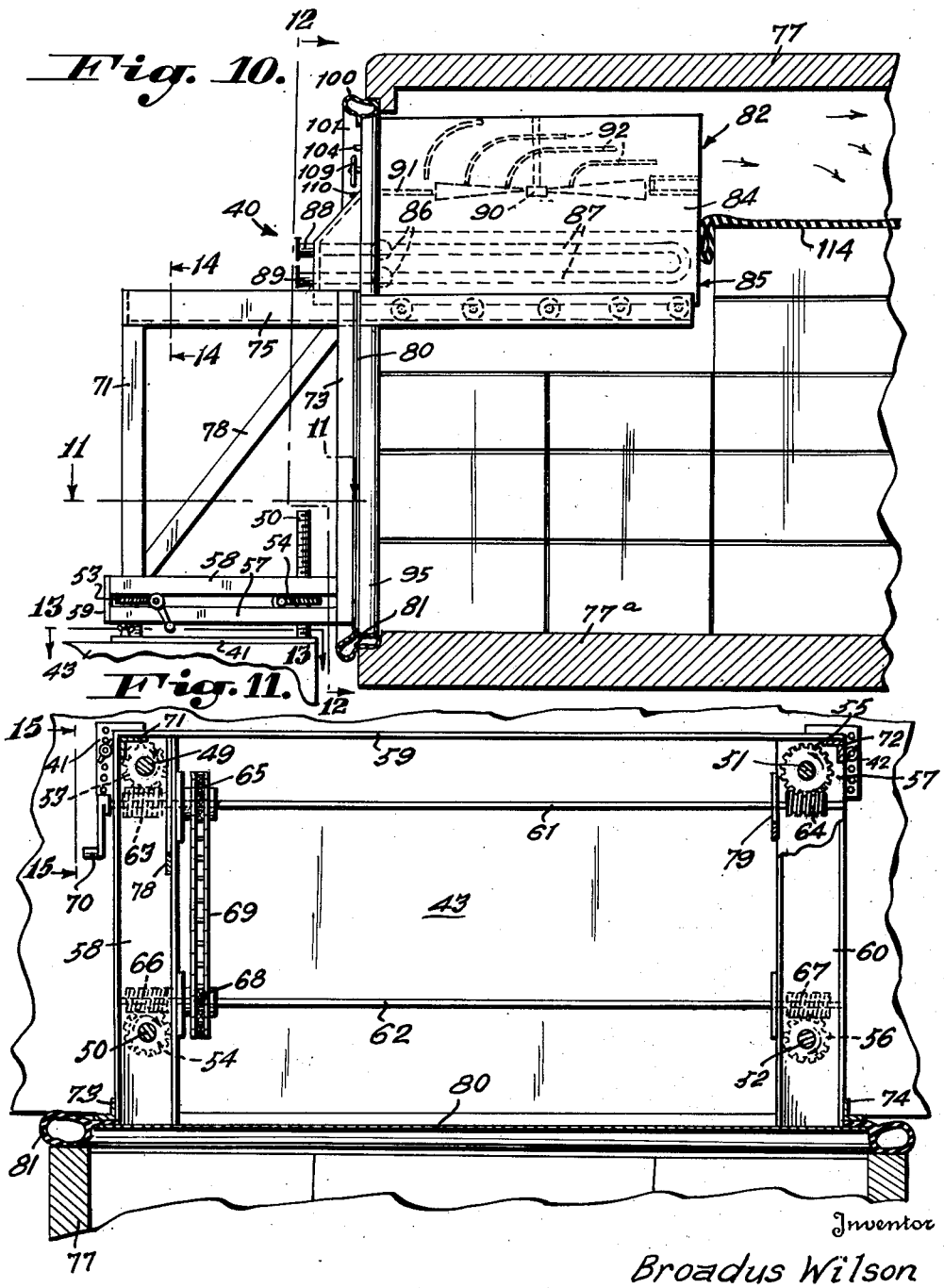

April 14, 1953  B. WILSON ET AL  2,634,589
APPARATUS FOR PRECOOLING TRANSPORTATION VEHICLES
Filed Sept. 12, 1949  4 Sheets-Sheet 4
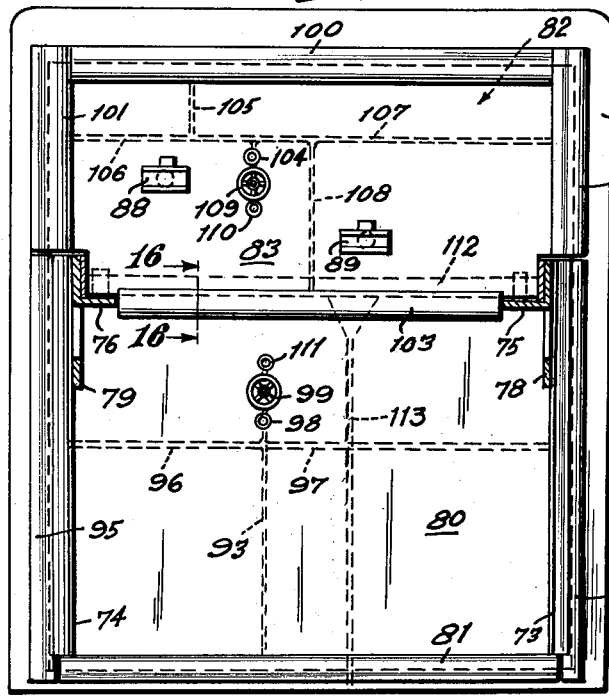
Fig. 12.
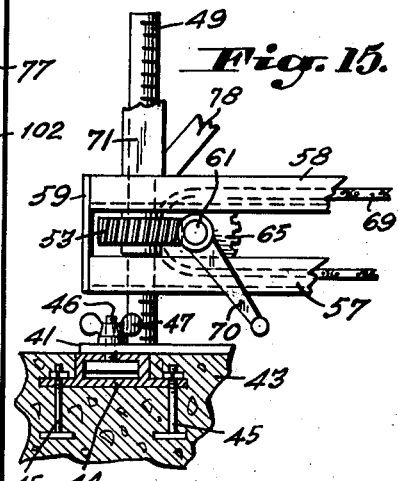
Fig. 15.
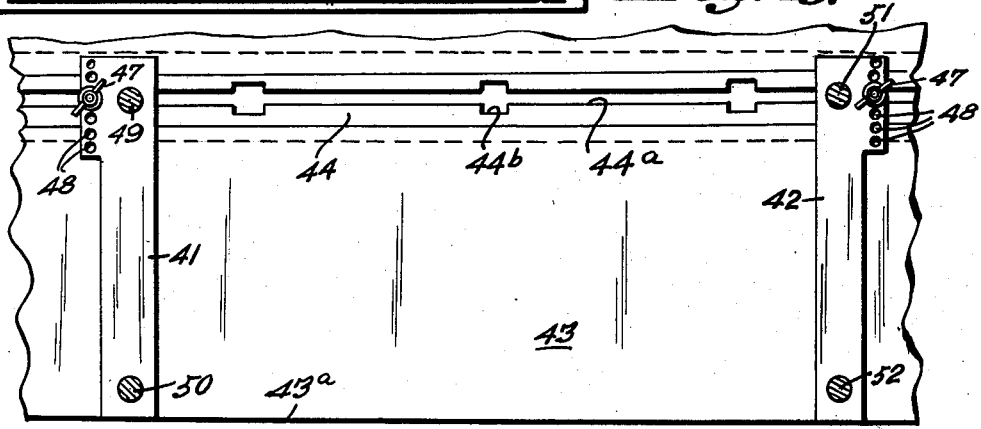
Fig. 13.
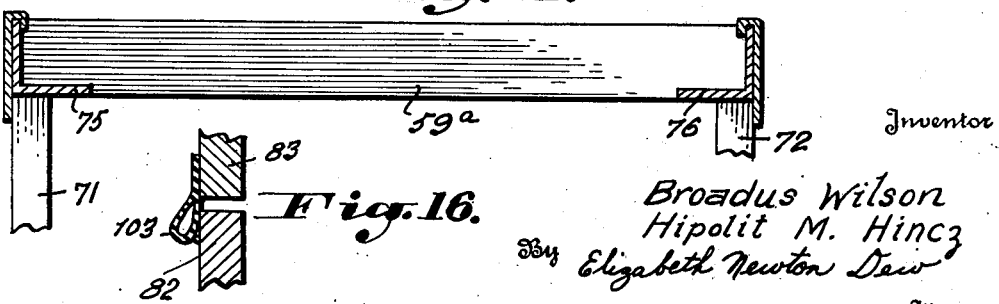
Fig. 14.
Fig. 16.
Inventor
Broadus Wilson
Hipolit M. Hincz
By Elizabeth Newton Dew
Attorney Patented Apr. 14, 1953

2,634,589

UNITED STATES PATENT OFFICE 2,634,589

APPARATUS FOR PRECOOLING TRANSPORTATION VEHICLES

Broadus Wilson, Raleigh, N. C., and Hipolit M. Hincz, Miami, Fla., assignors to Southern Air Conditioning Corporation, a corporation of Florida Application September 12, 1949, Serial No. 115,231

9 Claims. (Cl. 62—102)

1

In the shipment by railway refrigerator cars, of crated fruits such as oranges, it is customary to pre-cool the produce after the crated fruit has been loaded into the conveyance. Such precooling reduces the temperature of the crated produce to thereby retard decay and spoilage and, in connection with the refrigeration apparatus or ice bunkers with which the car may be equipped, ensures the arrival of the produce at its destination in fresh sound condition.

However, since any appreciable delay in starting a shipment after packing, results in an added cost of transportation, it is highly desirable that the pre-cooling should be carried out as quickly as possible in order to reduce overhead charges and to make fullest use of the car. These considerations apply also to the case of loaded refrigerator trucks which are to be pre-cooled.

The total weight of a load of closely-packed crates of fruit or vegetables is always less than the weight load capacity of the truck or car in which the load is packed. In other words, the average weight per cubic unit of crated food products is usually considerably less than the load-carrying capacity per cubic unit of the load-carrying space of the vehicle. Thus, carrying or transportation costs can be reduced to a minimum only by closely packing the crates in the shipping space. Prior to the present invention, where a load of produce was to be pre-cooled after loading into the conveyance, it was deemed necessary to provide spacer strips between successive layers or tiers of crates in order to afford a space between them for the circulation of chilled air. However, this procedure added to the time and cost for loading the conveyance, required an outlay for wooden spacer strips, and cut down the amount of space available for produce. As an alternative, the crates were stored in a cooling room after packing, until reduced to the proper shipping temperature and then loaded. This procedure is expensive in that it requires a refrigerating room of substantial size and involves the added cost of extra handling of each crate to place it in and remove it from the cooling room. It also undesirably increases the time between picking of the fruit and starting it on shipment to market.

We have found that it is possible to rapidly and satisfactorily pre-cool a conveyance loaded with tightly-packed crates, without spacer strips, provided that the chilled air is discharged into the space above the load in the proper direction and under a sufficiently high head or pressure.

It is therefore an object of the invention to provide an apparatus for rapidly and efficiently

2 pre-cooling a shipping compartment such as an automotive truck or railway refrigerator car tightly packed with loaded crates so that shipping costs, spoilage, and the elapsed time from picking of the fruit until it is started to market, are all reduced to a minimum.

Other objects and advantages will become apparent after a study of the following disclosure in connection with the drawings wherein are shown two species of apparatus suitable for carrying out the method of our invention.

In the drawings:

Figure 1 is a central vertical longitudinal section of a loaded truck having a pre-cooling apparatus connected with the rear end of the truck in the process of pre-cooling the load.

Figure 2 is a vertical transverse section taken in a plane identified by the line 2—2 of Figure 1 looking in the direction of the arrows and showing the inlet snout or nozzle, the rubber sealing tube between the cooling unit and truck, and the heat exchange unit.

Figure 3 is a detail cross section to an enlarged scale taken on the line 3—3 of Figure 2 and showing the details of the flexible inlet snout and hinged supporting shelf therefor in extended position, together with the sealing tube.

Figure 4 is a cross section corresponding to Figure 3 but showing the snout rolled up and the supporting shelf in raised or folded position.

Figure 5 is a detail sectional view taken as indicated by the line 5—5 of Figure 2 showing one of the pre-cooler supporting rollers and the sealing tube or gasket for effecting a fluid-tight seal or joint between the cooling unit and the open rear end of the vehicle.

Figure 6 is an elevation of the right side of the pre-cooler and rear end of a truck showing the manner in which the apparatus is temporarily secured to the truck during the carrying out of the pre-cooling method.

Figure 7 is a detail view to an enlarged scale, showing one of the clasps by which the pre-cooling apparatus and rear end of the truck are drawn together in fluid-tight relation while the pre-cooling process is being carried out.

Figure 8 is a side elevation of a number of crates of fruit or vegetables showing how the vehicle may be loaded to capacity while at the same time permitting adequate space for the circulation of chilled air through the crated produce.

Figure 9 is a view looking from the left of Figure 8 and showing a number of packed crates in end elevation.

Figure 10 is a view in longitudinal vertical section of a second form of apparatus with the fan and heat-exchange unit inserted into the rear end of a truck above the load therein.

Figure 11 is a horizontal sectional view to an enlarged scale taken in a plane indicated by the line 11—11, Figure 10, and showing the mechanism by which the pre-cooling unit may be raised and lowered to adjust the height thereof to the truck to be serviced.

Figure 12 is a sectional view to the same scale as Figure 10, taken in a plane indicated by line 12—12, Figure 10, showing the external controls and coolant connections to the pre-cooling unit.

Figure 13 is a section taken in a plane indicated by the line 13—13, Figure 10, showing the mechanism for securing the cooling unit to its supporting platform.

Figure 14 is a detail section to an enlarged scale taken on line 14—14, Figure 10 and showing details of the cooling unit frame.

Figure 15 is an elevational detail view, partly in section, in a plane indicated by the line 15—15, Figure 11, showing to an enlarged scale one of the extensible supporting legs of the cooling unit and the means by which it is anchored to its platform, and Figure 16 is a detail section taken in a plane indicated by line 16—16, Figure 12.

Referring in detail to the drawing, the numeral 1 identifies an automotive truck, shown in Figure 1 with its central portion broken away, and having its load-carrying space loaded with tightly-packed crates 2 to within a small distance of the top, say six inches.

A loading platform 3 supports a mobile pre-cooling unit generally identified at 4, and including a casing 5 supported by rollers or castors 6. Each castor is attached to the plunger or piston of a hydraulic jack device 7, Figure 5. All jack devices 7 are duplicates and are connected through a control valve, not shown, with a suitable source of fluid pressure so that all may be simultaneously operated to adjust the height of casing 5 from platform 3 relatively to the truck or trailer 1.

A fan or blower 8, which may be of the centrifugal type, is shown mounted in casing 5 with an inlet opening 9, and a discharge passage 10 leading to discharge opening 11 formed through the upper forward wall of casing 5. From Figure 2 it will be noted that the opening is wide enough to extend substantially the entire inside width of the load compartment of the truck but has a relatively short dimension vertically.

A shelf 12 is hinged at 13 along the lower edge of the opening 11 and is adapted to be swung from the open, horizontal position shown at Figure 3, to a raised position substantially as shown at Figure 4, to facilitate insertion of the shelf within the truck above the load. The snout or nozzle 14 is of rubber or resilient rubberized fabric and has its rear edges secured about the opening 11. As shown, the lower edge of the snout is attached to shelf 12 although it could be as well attached directly to the lower edge of the opening 11. The snout has substantially the same width as shelf 12 (see Figure 2) and a height about that of the usual space between the top layer of crates 2 and the ceiling 15 of the load compartment of the truck or trailer. Permanent creases 14a, Figure 3, are formed in the sides of the snout, so that it may be easily collapsed and rolled up to a position as shown in Figure 4, when not in use. At this time, the shelf may be held up by a cord or chain 16 having a loop at its end to slip over a button 17 on the shelf as will be obvious from Figure 4. A hand hole and removable cover 18 may be provided in the top of casing 5 to facilitate proper insertion of the snout into the space above the load. It is contemplated that, when in rolled condition as shown at Figure 4, the pressure in passage 10 will be sufficient to cause the snout to unroll to the position of Figure 3 and to force the shelf down upon the load. As the snout is expansible the pressure of the entering air will force it into contact with the adjacent walls and ceiling of the truck and effectively prevent short-circuiting or by-passing of the chilled entering air.

A substantially gas-tight seal between the open rear end of the truck or trailer and the communicating open end of casing 5, is effected by an inflatable pneumatic tube 19 of the same general size and shape as the rear loading opening of a standard trailer. Tube 19 is attached to the similarly-shaped rim of casing 5, by light flexible straps 20 of metal or woven tape. See particularly Figure 5. The lower rim of the rear opening of casing 5 is of substantial width in a vertical direction and the lower straps 20 are secured at their ends by screws 21 engaging threaded holes 22 in the casing. As indicated at 22, Figures 2 and 5, a number of these holes, vertically aligned, are provided so that the tube may be adjusted to size, by small distances, to accommodate truck openings of other than standard size. Thus, for example, where a truck is to be pre-cooled and has a rear loading opening whose vertical dimension is somewhat less than standard, jacks 7 are operated to adjust the top of tube 19 into alignment with the top edge of the rear of the truck. Thereafter, the lower portion of the tube is adjusted into registration with the lower edge of the truck, by means of the removable straps 20 and holes 22, in the manner just described. If desired or necessary, a similar arrangement may be provided to slightly adjust the side or vertical portions of tube 19 to accommodate trucks having load openings of a width other than standard.

In order to hold the truck and pre-cooler connected in air-tight relation, a number of latches 23, Figure 7, are provided, four such latches being shown. Each may consist of a threaded rod 24 bent at one end as at 25 to form a hook which may be engaged over one of the rear door hinges of the truck. The other or threaded end of the rod passes loosely through the aperture of a lug 26 carried by a latch lever 27 pivoted at 28 to the side of casing 5. In operation of these latches, with the truck in contact with tube 19 and the latter properly adjusted, rod 24 is hooked over a hinge and, with lever 27 in the dotted line position of Figure 7, wing nut 29 is threaded down on rod 24 until the latter is under tension. Lever 27 is then pivoted downwardly to the solid line position determined by stop pin 30. This pivotal movement acts in an obvious manner to draw the casing 5 toward the truck to compress tube 19 and establish a snug, air-tight seal between the truck load opening and casing 5. Also the tension on rod 24, being offset from pivot 28, acts to hold the latch in position. The tube may be filled with air under pressure and, if desired or found necessary, as where the truck opening is of unusual formation, additional air may be forced into the tube after connection has been made, as described, to expand the tube and make certain that it conforms to the truck to make an effective seal.

A radiator or heat exchange unit 31 is mounted to fit within an opening formed in an otherwise solid partition 32 below the walls of passage 10, so that all air drawn from the truck compartment by blower 8, must pass through the unit 31. Cooling fluid such as chilled brine, is supplied to and exhausted from the unit 31, by pipes 33 and 34 each having therein a control valve 35 and 36, respectively. Pipes 33 and 34 may be connected to form a circuit from a source of chilled liquid, not shown. Circulation is maintained by a suitable power pump, also not shown.

Figures 8 and 9 show in side and end elevation, respectively, a number of crates of fruit tightly packed within the truck. The crates have solid ends and, each is tightly packed so that the thin flexible side edges are bowed or flexed outwardly as illustrated in Figure 8. The crates are sized so as to utilize efficiently the available load-carrying space of standard trucks or trailers.

From Figures 8 and 9, it will be noted that the crates are tightly packed in the truck in end to end relation. Due to the aforementioned arcuate spaced side strips, the crates touch each other at their mid portions only, thus leaving a space of about one inch all around at their ends, as indicated at 37. At their central or mid portions, there is only a relatively small space between the bowed side slats, as indicated at 38, Figure 9. It will thus be seen that the available space for the passage of a given volume of chilled air, is materially greater at the ends of the crates than at their central portions. In other words, for a given volume of air to pass horizontally past a stack of crates located in any vertical cross sectional plane through the truck, the air after passing the ends of the crates, will enter the crates and pass between the interstices between the oranges or other articles, and emerge again adjacent the other end of the stack.

Heretofore, it was deemed impossible or inexpedient to pre-cool a load of crates tightly packed in the aforesaid manner because of the relatively great resistance to the passage of chilled air in and through the load. Hence it was previously the practice to pre-cool the packed crates in a refrigerated room prior to loading. However, this results in excessive handling costs, increased time between crating and shipment, and reheating of the fruit during loading. While fruit-carrying trucks are commonly equipped with refrigerating units, these do not ordinarily have sufficient capacity to reduce the temperature of the load very much, but only to maintain the low temperature of the load effected by pre-cooling.

We have discovered that satisfactory and efficient pre-cooling of a tightly packed load of crates can be effected provided a sufficiently high entering pressure is used to supply a large volume of chilled air above the load so that an appreciable portion of the entering air is forced to the front of the loaded compartment and is thus prevented from short-circuiting through the rear portion of the load only. In other words, by using a sufficiently high entering pressure, we utilize the resulting velocity of the entering cooling air to assure that the flow will be substantially uniform through all portions of the load to effect correspondingly uniform and rapid pre-cooling. In addition, the reduced space at the middle portions of the stacked crates compels a substantial volume to deflect through the interstices between the individual articles within the crates and thus assures adequate and substantially uniform extraction of heat from each of the articles within each crate. We have found that a static pressure of approximately 0.5 inch of water or more is satisfactory for the purpose of our invention and results in a remarkably even and rapid lowering of temperature throughout the load.

In carrying out the method of our invention with the apparatus shown in Figures 1–7, the loaded truck, with its rear doors open, is backed up against the tube 19 after any necessary adjustments have been made in the position of the latter by means of straps 20. Hooks 23 are adjusted and turned down and the tube 19 is additionally inflated if necessary or desirable. Shelf 12 is released and the circulation of chilled liquid through pipes 33 and 34 is begun. The motor driving blower 8 is started and the pressure generated will ordinarily force nozzle 14 and shelf 12 to the positions shown at Figure 1. Otherwise the parts can be manually adjusted by removal of cover 18. The blower has a capacity and speed sufficient to discharge the air from nozzle 14 under a relatively high pressure of 0.5 inch of water or more. As a result we have found that, despite the tightly packed load, a proportionate volume of chilled air is forced to the front of the load so that an even circulation through the load is established. Furthermore, since the chilled air is forced to detour through the crates at the centers thereof, the air directly contacts the oranges or other articles packed therein and results in a remarkably rapid and even "pull down" of the temperature of the load. The blower has a capacity and speed sufficient to discharge air from the nozzle in large volume, of the order of 10,000 C. F. M. and under the relatively high pressure of 0.5 inch of water, as previously mentioned.

In Figures 10 through 15, we have shown a second preferred form of apparatus for carrying out the invention. In these figures, a cooling unit generally identified at 40 comprises a frame consisting of spaced parallel bottom plates 41 and 42, Figure 13, adapted to be adjustably fixed to the supporting platform 43. As shown best at Figure 15, a metallic strip 44, generally C-shaped in cross section is embedded and anchored in the platform in parallel spaced relation with the edge 43a thereof, as by anchor bolts 45 so that the top surface of the strip with its slot 44a, Figure 13, is flush with the platform surface. At intervals the slot 44a is notched as at 44b for the insertion of a pair of square-headed bolts 46 which have their shanks extending up through slot 44a and a selected one of a plurality of holes 48 in a respective plate 41 or 42. A wing nut 47 on each bolt clamps its plate to the platform. By providing a number of holes 48, the position of the cooling unit may be adjusted relatively to the edge of the platform as will be obvious from Figure 13.

Plate 41 has a pair of spaced vertical screws 49 and 50 welded thereto and rising therefrom. Likewise, plate 42 has a similar pair of screws 51 and 52 secured to it. Screw 49 has a worm gear 53, Figure 15, threaded thereon. Likewise the screws 50, 51 and 52 have respective worm gears, 54, 55 and 56 threaded thereon. Gears 53 and 54 are journaled in and between a frame comprising vertically spaced parallel channels 57 and 58 rigidly connected at their ends in back-to-back relation by plate 59, Figure 15. The gears are so mounted as to be freely rotatable but prevented from axial movement relatively to channels 57 and 58. Gears 55 and 56 are journaled in a like manner between channels, one of which is identified at 60, Figure 11. The screws 49 and 51 are left hand while screws 50 and 52 are right hand.

Spaced horizontal parallel shafts 61 and 62, Figure 11, are journaled in and between the channels in a manner obvious from inspection of Figure 15. Shaft 61 has worms 63 and 64 keyed thereto, each in mesh with a gear 53 and 55, respectively. Shaft 61 also has sprocket 65 keyed thereto in any convenient position on the shaft.

Shaft 62 is journaled in the same manner as shaft 61 and has worms 66 and 67 keyed thereto, in mesh with respective gears 54 and 56. A sprocket 68 is keyed to shaft 62 and is connected with sprocket 65 by a chain 69. A crank 70 is fixed to the protruding end of shaft 61 and, when turned, simultaneously operates all of the worm gears to effect their equal translation, together with channels 57, 58, etc. vertically along the fixed screws 49 through 52.

A frame comprises vertical angles 71 and 73 welded to the respective ends of channels 59, and like vertical angles 72 and 74 welded to bottom channels 60. Angles 71 and 73 are connected at their tops by an angle 75, Figures 10 and 12, with its lower flange projecting inwardly to form a track. Verticals 72 and 74 are connected in a similar manner by a horizontal angle 76 also positioned with its lower horizontal flange extending inwardly toward track 75. From Figure 10 it will be noted that the tracks project a substantial distance forwardly from the verticals 73 and 74 so that they may extend into the upper rear portion of truck or trailer 77. From Figure 11, it will be noted that plate 59 unites the frame parts at the rear lower portion. Braces such as 78 and 79 are provided to lend rigidity to the frame.

A relatively thin solid lower plate 80 is secured to the forward faces of verticals 73 and 74. As seen from Figure 12, this plate extends upwardly to and abuts against, the under sides of tracks 75 and 76 and, in conjunction with pneumatic sealing tube 81, later described, effectively seals the lower portion of the truck's rear loading opening during pre-cooling.

The cooling unit consists of a generally rectangular casing 82 having a solid rear wall plate 83 and duplicate side plates 84 one of which is shown in Figure 10. From Figure 12 it will be noted that the rear wall plate 83 is shaped and dimensioned to coact with lower plate 80 to form a substantially complete closure for the loading opening of the trailer when the unit is in operating position therewithin. A heat exchange unit 85 is shown, merely illustratively, as a pair of headers 86 interconnected by a plurality of U-shaped pipes 87. Coolant such as chilled brine is supplied under pressure, by means not shown, through a supply coupling 88, and exhausted through a second coupling 89. See Figures 10 and 12. Valves, not shown, may be provided, if desired between each coupling 88 and 89 and its respective header.

A bladed fan 90 is mounted for rotation on a central vertical axis over the cooling coils 87 and within a circulating opening in a horizontal shroud plate 91. A series of curved turning or deflector plates 92 are mounted over the fan to deflect the chilled air horizontally and forwardly in the truck over the load.

As best shown in Figure 12, a substantially gas tight seal is effected between the plates 80 and 82 and the truck, by means of inflatable pneumatic tubes. These include a lower tube 81 secured to and extending along the lower edge of plate 80, in position to engage the rear edge of the truck floor as clearly shown at Figure 10. This tube may be inflated and deflated by air supplied through a pipe 93. A pair of sealing tubes 94 and 95 are coextensive with the vertical side edges of plate 80 and are supplied with air under pressure by way of branch pipes 96 and 97, Figure 12. Pipes 93, 96 and 97 are supplied from a single nipple 98. A shut-off valve 99 enables the tubes to be deflated when desired. In a similar manner, a pneumatic tube 100 is attached to the top edge of wall 83 to effect a seal between this edge and the truck. Likewise vertical tubes 101 and 102 are secured to the vertical side edges of plate 83 and, in conjunction with tubes 94 and 95 complete a seal along the vertical edges of the truck load opening. Another pneumatic tube 103, Figure 12, is attached along the lower edge of wall plate 83 and, when the cooling unit is rolled into final position along tracks 75 and 76, that is, the position shown in Figure 10, contacts the upper edge of plate 80 and effectively seals the crack between the adjacent edges of the plates. Tubes 100, 101, 102 and 103, are supplied with air from a common nipple 104 and branch pipes 105, 106, 107 and 108 leading to the respective tubes. A valve 109 enables the tubes to be deflated when desired. Nipples 98 and 104 may be the same as those used in automobile inner tubes. Valves 99 and 109 permit air to escape directly from nozzles 110 and 111 without passing through nipples 98 and 104.

A shallow pan 112, Figure 12, is mounted within the cooling unit 82, below coils 87, for the purpose of catching condensate dropping from the coils. This condensate may be drained from the pan by way of a pipe 113. A valve, not shown, may be used to drain the pan as desired. From Figure 10, it will be noted that a blanket 114 with a tubular edge, is placed over the tops of the crates forwardly of the blower unit 82 is position to have its rolled edge pressed between the blower casing and the adjacent top row of crates. This blanket extends over the first few tiers of crates only and acts, in an obvious manner, to prevent short-circuiting of the chilled air through the load.

In using the form of the invention just described, the truck or trailer, fully loaded except for two or three tiers at the rear of the load, as indicated upon Figure 10, is backed up into approximately correct position adjacent platform 43. Any necessary adjustments of the cooler unit 40 laterally or forwardly can be effected after loosening wing nuts 47. Crank 70 is then operated to effect any necessary adjustments of the unit vertically. Unit 82 is then rolled along tracks 75 and 76 into the truck, after placement of blanket 114 as in Figure 10. When the unit 82 is in position as shown in Figure 10, its rear panel 83 completes the closure of the load opening. All pneumatic tubes are now in position to complete the sealing of the load opening. If desired, the tubes may be additionally inflated from a source of air pressure, not shown, applied to nipples 98 and 104.

Pipe connections from a source of cooling liquid, not shown, is made with couplings 88 and 89 and the circulation of liquid through coils 87 is begun. The motor, not shown, driving fan 90 by means of a conventional V-belt and pulleys, is started. Air from the rear lower portion of the load is drawn upward, cooled in passing coils 87, and deflected forwardly by vanes 92 over the load. Because of the high discharge pressure the chilled air is projected forwardly over the load in such a manner that an even flow is established throughout the load, with consequent rapid, even, and efficient lowering of temperature in all parts thereof.

We have thus provided a pre-cooling apparatus which permits maximum loading of the conceyance while effecting the rapid and efficient reduction in the temperature thereof. As a result, shipping costs and spoilage in transit are reduced to a minimum.

The method of pre-cooling, herein disclosed, forms the subject of our co-pending application, Serial No. 328,750, filed November 24, 1952, for Method for Precooling Transportation Vehicles.

While we have shown the preferred form of the invention, together with a modification thereof, various changes, rearrangements of parts, and substitution of equivalents will occur to those skilled in the art after a study of the foregoing disclosure. Consequently, we desire not to be limited to the precise details of construction shown and the disclosure should be taken in an illustrative rather than a limiting sense. It is our desire and intention to reserve all such changes as fall within the scope of the subjoined claims.

Having now fully disclosed the invention, what we claim and desire to secure by Letters Patent is:

1. In a pre-cooler for pre-cooling the load-carrying compartment of a vehicle, said compartment being enclosed except for a loading opening in one wall thereof, a frame, a pre-cooling unit comprising a heat exchange unit and a power-driven blower in adjacent cooperative relation, means mounting said unit on said frame for movement through said load opening into said compartment, and closure means fixed in relation with said unit and movable as a unit therewith in response to movement of said pre-cooling unit into said compartment, to close that portion of said loading opening traversed by said unit.

2. A pre-cooler as in claim 1, and second closure means fixedly carried by said frame below and cooperable with said first closure means to completely close said opening when said vehicle and pre-cooler are moved into cooperative position.

3. In a pre-cooler for the enclosed load carrying space of a vehicle, there being a loading opening in one wall of said vehicle, a frame fixedly supported independently of said vehicle, a first panel carried by said frame in position to close the lower area only of said opening when said vehicle is moved into pre-cooling position thereadjacent, pre-cooling means comprising a heat exchange unit and a blower unit in cooperative relation, means carried by said frame supporting said pre-cooling means for horizontal translation into the vehicle through the upper area of said loading opening, and second panel means fixed with and behind said pre-cooling means to complete the closure of said loading opening when said pre-cooling means has been moved into operative position within said space.

4. The combination with an automotive vehicle having an enclosed load-carrying space included rear doors adapted to close an opening through which the space may be loaded, a pre-cooling unit comprising a fixedly mounted frame, a first, vertical, lower panel mounted on said frame and adapted to close the lower portion of the opening when the vehicle is positioned into pre-cooling relation therewith, horizontal tracks fixed with said frame and projecting forwardly from the upper edge of said lower panel, combined blower and cooling coil means mounted on said frame for horizontal movement thereon into the upper portion of said load-carrying space, and a second vertical upper panel fixed with and movable as a unit with said blower and cooling coil means in position to cooperate with said first panel and complete the closure of the opening when said blower and cooling coil means are in operating position within the load-carrying space.

5. In combination with an automotive vehicle having an enclosed load-carrying space and rear doors adapted to close a loading opening to said space, a pre-cooling mechanism, comprising a frame, a panel on said frame and adapted to close the lower portion of said opening when the vehicle is backed into pre-cooling position thereagainst, a track means carried by said frame and projecting into the upper portion of said opening when the vehicle is in said position, a pre-cooling unit comprising cooling coils and a blower element translatable on and along said track means into an operative pre-cooling position in the vehicle, and an upper panel fixedly carried by said unit rearwardly thereof and complementarily with said lower panel to complete the closure of said loading opening when said pre-cooling unit is moved into pre-cooling position within the load-carrying space.

6. In a pre-cooling unit for an automotive-propelled vehicle having an enclosed load-carrying space with a rear opening through which said space is loaded, a frame supported independently of said vehicle, a vertical lower panel carried by said frame in position to close the lower portion only of said opening when said vehicle is backed into pre-cooling position thereagainst, a pair of spaced horizontal tracks projecting from said frame into said load-carrying space through the upper portion of said opening when the vehicle is in pre-cooling position, a cooperating liquid-to-air heat exchange means and power-driven blower mounted for translation as a unit on and along said tracks into said space, and a vertical upper panel in fixed relation with, and movable as a unit with said heat exchange means and blower, to coact with said lower panel and complete the closure of said opening when said heat exchange means and blower are moved on and along said tracks into operating position within said space.

7. A pre-cooling unit as recited in claim 6, and pneumatic tube means extending along the edges of said panels in position to seal any spaces between the panels and edges of the vehicle's rear opening, and inflating pipes carried by said panels connected with said tubes.

8. In a pre-cooler for the load-carrying space of an automotive vehicle trailer having a loading opening in its rearward end, a fixed support, a frame, means mounting said frame on said support, a lower rectangular panel fixed in vertical position forwardly of said frame in position to close the lower part only of said opening when the trailer is backed thereagainst, said frame including a pair of fixed, laterally-spaced parallel horizontal track members extending forwardly of said lower panel to extend into the trailer when the same is in position against said panel, a pre-cooling heat exchange unit, means mounting said unit upon said tracks for translation therealong from a first position wholly outside the trailer, to a second operating position within the trailer when the latter is in position against said lower panel, and an upper panel fixed with said pre-cooling heat exchange unit and movable as a unit therewith, said upper panel cooperating with said lower panel to effect complete closure of the loading opening of the trailer when said heat exchange unit has been translated into operating position therewithin.

9. The pre-cooler of claim 8, said heat exchange unit including coils for conduction of liquid coolant and including inlet and exhaust connections mounted upon the rearward face of said upper panel.

BROADUS WILSON.
HIPOLIT M. HINCZ.

References Cited in the file of this patent

UNITED STATES PATENTS

| Number | Name | Date |
|---|---|---|
| 2,115,344 | Stacey | Apr. 26, 1938 |
| 2,240,377 | Preble | Apr. 29, 1941 |
| 2,257,221 | Bell | Sept. 30, 1941 |
| 2,293,316 | Stebbins | Aug. 18, 1942 |
| 2,293,360 | Reilly | Aug. 18, 1942 |
| 2,346,931 | Mann | Apr. 18, 1944 |
| 2,477,250 | Hincz | July 26, 1949 |
| 2,523,749 | Wilson | Sept. 26, 1950 |
| 2,538,382 | Reilly | Jan. 16, 1951 |